United States Patent
Saeedi et al.

(10) Patent No.: US 11,843,772 B2
(45) Date of Patent: Dec. 12, 2023

(54) VIDEO ENCODE PRE-ANALYSIS BIT BUDGETING BASED ON CONTEXT AND FEATURES

(71) Applicant: ATI Technologies ULC, Markham (CA)

(72) Inventors: Mehdi Saeedi, Thornhill (CA); Boris Ivanovic, Richmond Hill (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/706,473

(22) Filed: Dec. 6, 2019

(65) Prior Publication Data

US 2021/0176467 A1 Jun. 10, 2021

(51) Int. Cl.
| | |
|---|---|
| *H04N 19/115* | (2014.01) |
| *H04N 19/85* | (2014.01) |
| *H04N 19/124* | (2014.01) |
| *H04N 19/167* | (2014.01) |
| *H04N 19/176* | (2014.01) |

(52) U.S. Cl.
CPC ......... *H04N 19/115* (2014.11); *H04N 19/124* (2014.11); *H04N 19/167* (2014.11); *H04N 19/176* (2014.11); *H04N 19/85* (2014.11)

(58) Field of Classification Search
CPC .. H04N 19/115; H04N 19/167; H04N 19/124; H04N 19/176; H04N 19/85
USPC ..................................................... 375/240.02
See application file for complete search history.

(56) References Cited

U.S. PATENT DOCUMENTS

| | | | |
|---|---|---|---|
| 5,592,227 A | 1/1997 | Feng | |
| 5,768,533 A | 6/1998 | Ran | |
| 6,014,466 A * | 1/2000 | Xia | ........................ G06T 9/007 |
| | | | 375/240 |

(Continued)

FOREIGN PATENT DOCUMENTS

| | | |
|---|---|---|
| EP | 2899962 A1 | 7/2015 |
| EP | 3098762 A1 | 11/2016 |
| WO | 2017003887 A1 | 1/2017 |

OTHER PUBLICATIONS

Hoffman et al., "RTP Payload Format for MPEG1/MPEG2 Video", RFC 2250, Jan. 1998, 16 pages, https://www.rfc-editor.org/info/rfc2250.

(Continued)

*Primary Examiner* — Tung T Vo
(74) *Attorney, Agent, or Firm* — KOWERT HOOD MUNYON RANKIN AND GOETZEL PC; Rory D. Rankin

(57) ABSTRACT

Systems, apparatuses, and methods for bit budgeting in video encode pre-analysis based on context and features are disclosed. A pre-encoder receives a video frame and evaluates each block of the frame for the presence of several contextual indicators. The contextual indicators can include memory colors, text, depth of field, and other specific objects. For each contextual indicator detected, a coefficient is generated and added with other coefficients to generate a final importance value for the block. The coefficients can be adjusted so that only a defined fraction of the picture is deemed important. The final importance value of the block is used to determine the bit budget for the block. The block bit budgets are provided to the encoder and used to influence the quantization parameters used for encoding the blocks.

20 Claims, 10 Drawing Sheets

(56) References Cited

U.S. PATENT DOCUMENTS

| | | | |
|---|---|---|---|
| 6,067,287 A | 5/2000 | Chung-Ju et al. | |
| 6,427,028 B1* | 7/2002 | Donescu | H04N 19/649 375/E7.081 |
| 6,654,539 B1 | 11/2003 | Duruoz et al. | |
| 6,956,965 B1* | 10/2005 | Cuijpers | H04N 1/648 382/164 |
| 7,436,890 B2 | 10/2008 | Takagi et al. | |
| 8,131,660 B2 | 3/2012 | Davis et al. | |
| 8,599,214 B1* | 12/2013 | Dall | H04N 1/64 345/589 |
| 9,554,142 B2 | 1/2017 | Guerrero | |
| 10,078,794 B2 | 9/2018 | Pierce et al. | |
| 10,762,392 B2 | 9/2020 | Zhang et al. | |
| 10,924,739 B2 | 2/2021 | Lew et al. | |
| 2006/0039483 A1 | 2/2006 | Lee et al. | |
| 2007/0036227 A1* | 2/2007 | Ishtiaq | H04N 19/172 375/240.26 |
| 2007/0074266 A1* | 3/2007 | Raveendran | H04N 19/36 725/135 |
| 2009/0284581 A1 | 11/2009 | Elbaz et al. | |
| 2011/0158470 A1* | 6/2011 | Martin | H04N 19/467 382/100 |
| 2012/0182582 A1 | 7/2012 | Nagai | |
| 2014/0176586 A1 | 6/2014 | Gruber et al. | |
| 2015/0195379 A1 | 7/2015 | Zhang et al. | |
| 2015/0281705 A1 | 10/2015 | Wang et al. | |
| 2015/0373328 A1* | 12/2015 | Yenneti | H04N 19/12 375/240.03 |
| 2016/0093271 A1 | 3/2016 | Cho et al. | |
| 2016/0150229 A1* | 5/2016 | Jun | H04N 19/115 375/240.03 |
| 2016/0189416 A1* | 6/2016 | Naguib | H04W 4/02 345/441 |
| 2016/0219301 A1 | 7/2016 | Pettersson et al. | |
| 2017/0034513 A1* | 2/2017 | Leontaris | H04N 19/15 |
| 2017/0041625 A1 | 2/2017 | Bates et al. | |
| 2017/0064320 A1 | 3/2017 | Sadhwani et al. | |
| 2018/0139439 A1* | 5/2018 | Jun | H04N 19/187 |
| 2018/0189641 A1 | 7/2018 | Boesch et al. | |
| 2018/0343449 A1 | 11/2018 | Amer et al. | |
| 2018/0376153 A1* | 12/2018 | Gokhale | H04N 19/137 |
| 2019/0028752 A1 | 1/2019 | Zhang et al. | |
| 2019/0147332 A1 | 5/2019 | Lagudu et al. | |
| 2019/0238952 A1* | 8/2019 | Boskovich | G06K 9/00201 |
| 2019/0325305 A1 | 10/2019 | Zhang et al. | |
| 2019/0332883 A1 | 10/2019 | Ivanovic | |
| 2019/0335189 A1 | 10/2019 | Abdelkhalek et al. | |
| 2020/0134432 A1 | 4/2020 | Lagudu et al. | |
| 2020/0302285 A1 | 9/2020 | Wang et al. | |
| 2021/0027485 A1* | 1/2021 | Zhang | G06V 10/82 |

OTHER PUBLICATIONS

International Search Report and Written Opinion in International Application No. PCT/IB2019/051542, dated May 31, 2019, 8 pages.

International Search Report and Written Opinion in International Application No. PCT/US2018/052358, dated Feb. 18, 2019, 13 pages.

Cecconi et al., "Optimal Tiling Strategy for Memory Bandwidth Reduction for CNNs", International Conference on Advanced Concepts for Intelligent Vision Systems, Sep. 18, 2017, pp. 89-100.

Fan et al., "F-C3D: FPGA-based 3-Dimensional Convolutional Neural Network", 27th International Conference on Field Programmable Logic and Applications (FPL), Sep. 4, 2017, 4 pages.

Rahman et al., "Efficient FPGA Acceleration of Convolutional Neural Networks Using Logical-3D Compute Array", Proceedings of the 2016 Conference on Design, Automation Test in Europe, Mar. 14, 2016, pp. 1393-1398.

International Search Report and Written Opinion in International Application No. PCT/IB2020/061528, dated Mar. 16, 2021, 8 pages.

* cited by examiner

VIDEO ENCODE PRE-ANALYSIS BIT BUDGETING BASED ON CONTEXT AND FEATURES

BACKGROUND

Description of the Related Art

Various applications perform encoding and decoding of images or video content. For example, video transcoding, desktop sharing, cloud gaming, and gaming spectatorship are some of the applications which include support for encoding and decoding of content. An encoder typically has a target bitrate which the encoder is trying to achieve when encoding a given video stream. The target bitrate roughly translates to a target bitsize for each frame of the encoded version of the given video stream. For example, in one implementation, the target bitrate is specified in bits per second (e.g., 3 megabits per second (Mbps)) and a frame rate of the video sequence is specified in frames per second (fps) (e.g., 60 fps, 24 fps). In this example implementation, the preferred bit rate is divided by the frame rate to calculate a preferred bitsize of the encoded video frame. Here the assumption is bitrate trajectory is linear. If not linear, a similar approach can be taken to roughly estimate the preferred bitsize of the encoded frame.

Each video frame is typically partitioned into a plurality of blocks. Examples of blocks include a coding tree block (CTB) for use with the high efficiency video coding (HEVC) standard or a macroblock for use with the H.264 standard. Other types of blocks for use with other types of video and image compression standards are also possible. The encoder can adjust how each block of a frame is encoded based on the a measured property (e.g. detail level, contrast, etc.) of block being encoded. However, if the content of the frame is largely homogeneous, it is not favorable to apply an adjustment used for one block to the entire frame. For example, the encoder can decide to allocate a higher bit budget for blocks that are very detailed. However, if most of the blocks are highly detailed, the encoder will quickly run out of available bits in the budget. Nature scenes (e.g., forest, grass) as well as video games are typical examples where the entire picture or a large portion of the picture is detailed and/or homogeneous.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for bit budgeting in video encode pre-analysis based on context and features are disclosed herein. In one implementation, a system includes a pre-encoder and an encoder for encoding a video stream. In one implementation, the pre-encoder receives a video frame and evaluates each block of the frame for the presence of several contextual indicators. The graduality of the blocks can be pre-defined or set adaptively. For each block, the pre-encoder determines whether any of multiple different types of contextual indicators are present in the block. The contextual indicators can include, but are not limited to, memory colors, text, depth of field, and other specific objects. For each contextual indicator detected, a coefficient is generated and added with other coefficients to generate a final importance value for the block. The coefficients are adjusted so that only a defined fraction of the picture is deemed important, and blocks that are deemed important are allocated a specific percentage of the total available bit budget. The final importance value of the block will be used to influence the bit budget for the block while also taking into account the final importance values of the other blocks. The block bit budgets are provided to the encoder and used to influence e.g., the quantization parameters used for encoding the blocks. It is noted that the bit budgeting based on contextual indicators can be combined with one or more other techniques to determine the overall bit budgets to be used for the blocks of a frame. In one implementation, the encoder selects a quantization strength (e.g., quantization parameter ("QP")) to use when encoding each block based on the bit budget assigned to the block by the pre-encoder.

Figure 1:
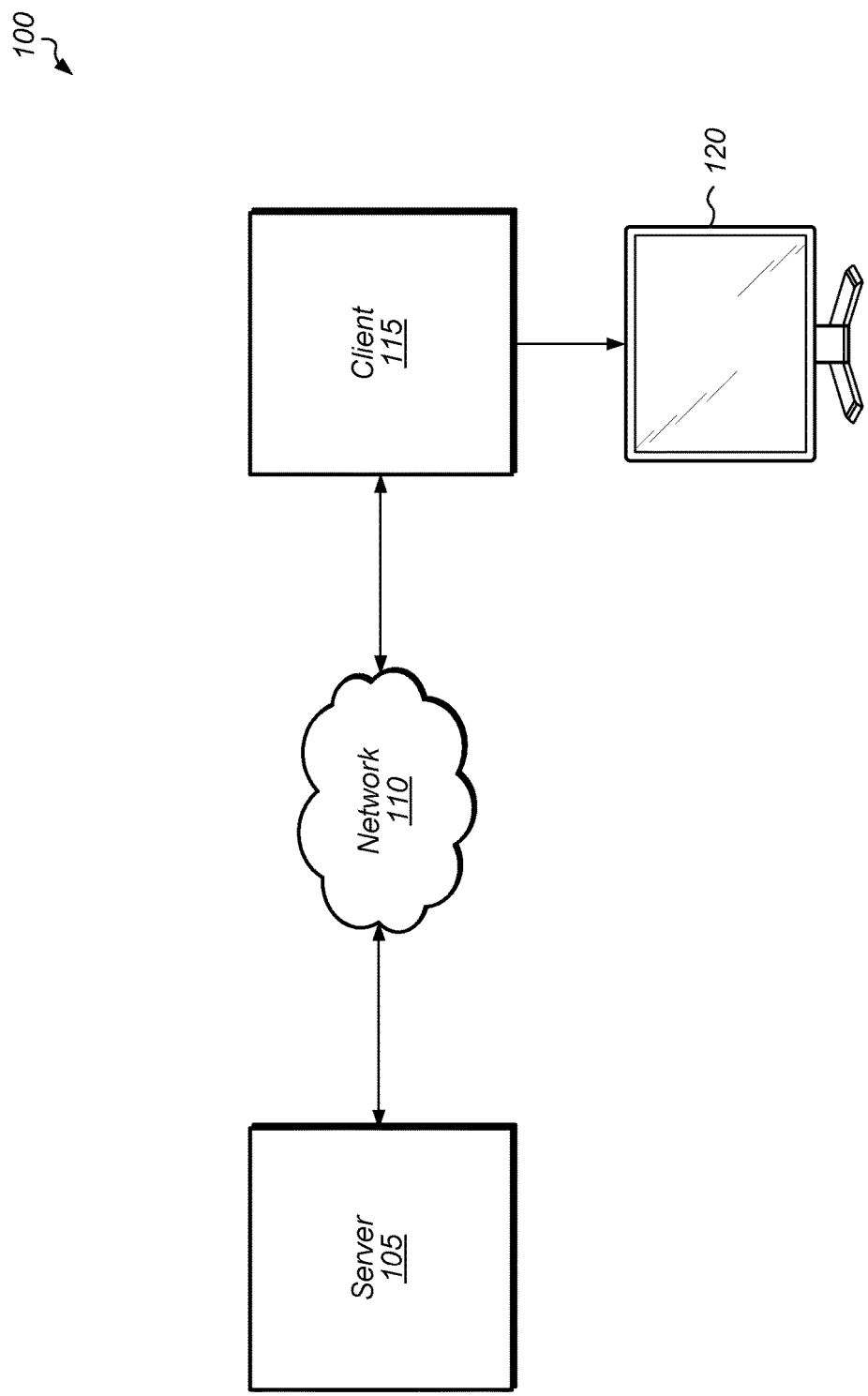
FIG. 1 is a block diagram of one implementation of a system for encoding and decoding content.

Referring now to FIG. 1, a block diagram of one implementation of a system 100 for encoding and decoding content is shown. System 100 includes server 105, network 110, client 115, and display 120. In other implementations, system 100 includes multiple clients connected to server 105 via network 110, with the multiple clients receiving the same bitstream or different bitstreams generated by server 105. System 100 can also include more than one server 105 for generating multiple bitstreams for multiple clients.

In one implementation, system 100 encodes and decodes video content. In various implementations, different applications such as a video game application, a cloud gaming application, a virtual desktop infrastructure application, a self-driving vehicle application, an online streaming application, a screen sharing application, or other types of applications are executed by system 100. In one implementation, server 105 renders video or image frames and then encodes the frames into an encoded bitstream. In one implementation, server 105 includes a pre-encoder and an encoder to manage the encoding process. The pre-encoder can also be referred to herein as a "pre-analysis unit".

In one implementation, the pre-encoder analyzes the blocks of a frame to detect contextual indicators. As used herein, a "contextual indicator" is defined as a feature that is regarded as having perceptual importance for the specific application being executed by the system. In one implementation, contextual indicators include features such as signs, text, faces, bodies, everyday objects (e.g., cars, streets, street lights) and memory colors. As used herein, a "memory color" is defined as a familiar color with relevance to the scene presented in the frame. One example of a "memory color" is a flesh tone. In other implementations, other applications can have other types of contextual indicators.

For each block, an importance value is generated based on which contextual indicators were detected in the block and the scores assigned to the contextual indicators. The importance value is optionally adjusted based on one or more other variables, such as rarity of a detected contextual indicator. The pre-encoder assigns a bit budget to each block based on the importance value generated for the block. In one implementation, the importance values of the blocks are scaled so that the total number of bits assigned to all of the blocks is within a bit-size range calculated based on the encoded bitstream meeting a target bitrate. The encoder then encodes the block to match the bit budget assigned to the block by the pre-encoder. In one implementation, the encoder adjusts a quantization parameter (QP) used to encode the block to cause the encoded block to be within a threshold amount of the assigned bit budget. After the encoded bitstream is generated, server 105 conveys the encoded bitstream to client 115 via network 110. Client 115 decodes the encoded bitstream and generates video or image frames to drive to display 120 or to a display compositor.

Network 110 is representative of any type of network or combination of networks, including wireless connection, direct local area network (LAN), metropolitan area network (MAN), wide area network (WAN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. In various implementations, network 110 includes remote direct memory access (RDMA) hardware and/or software, transmission control protocol/internet protocol (TCP/IP) hardware and/or software, router, repeaters, switches, grids, and/or other components.

Server 105 includes any combination of software and/or hardware for rendering video/image frames and encoding the frames into a bitstream. In one implementation, server 105 includes one or more software applications executing on one or more processors of one or more servers. Server 105 also includes network communication capabilities, one or more input/output devices, and/or other components. The processor(s) of server 105 include any number and type (e.g., graphics processing units (GPUs), central processing units (CPUs), digital signal processors (DSPs), field programmable gate arrays (FPGAs), application specific integrated circuits (ASICs)) of processors. The processor(s) are coupled to one or more memory devices storing program instructions executable by the processor(s). Similarly, client 115 includes any combination of software and/or hardware for decoding a bitstream and driving frames to display 120. In one implementation, client 115 includes one or more software applications executing on one or more processors of one or more computing devices. In various implementations, client 115 is a computing device, game console, mobile device, streaming media player, or other type of device.

Figure 2:
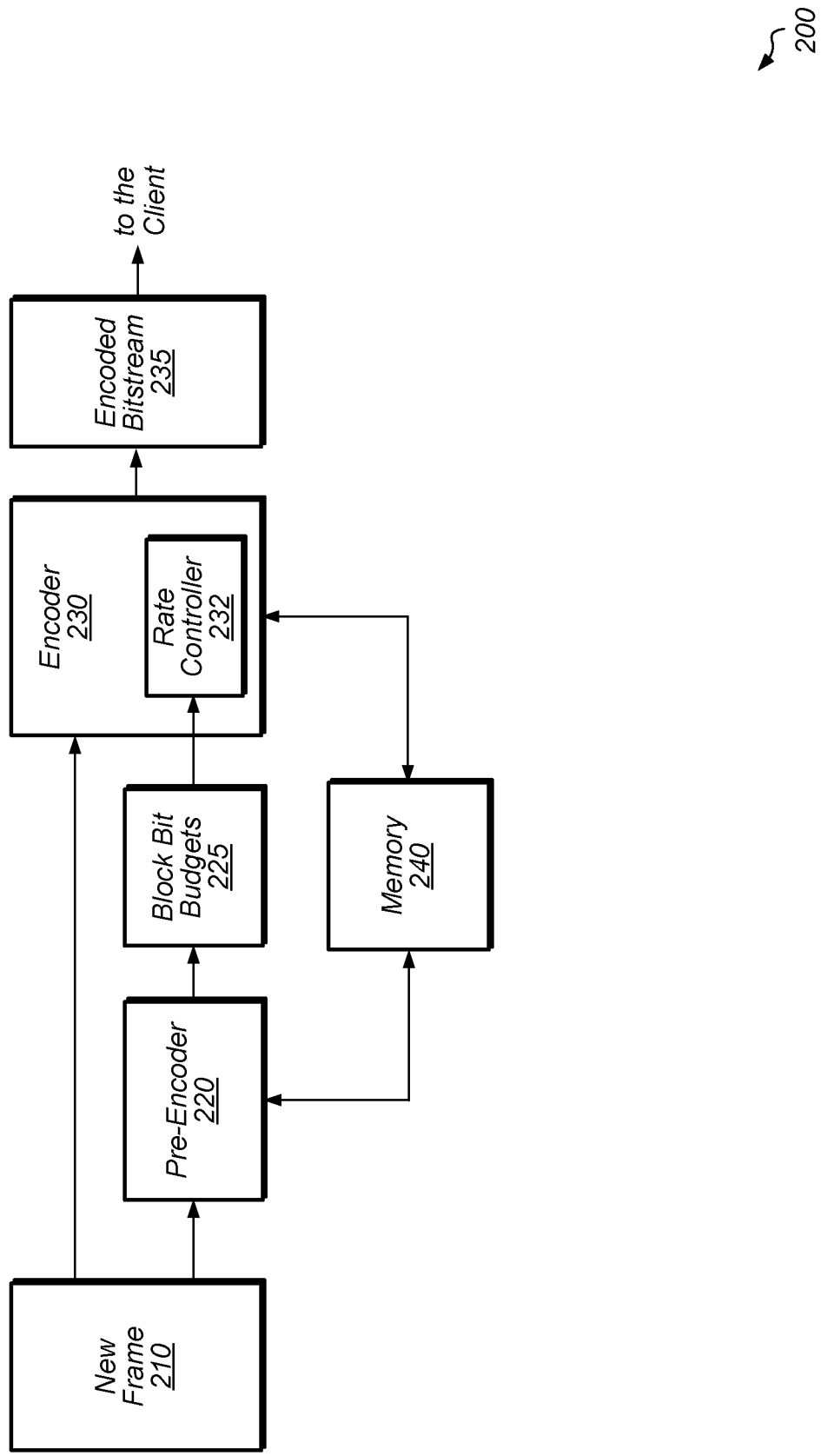
FIG. 2 is a block diagram of one implementation of a server.

Turning now to FIG. 2, a block diagram of one implementation of the components of a server 200 for encoding frames of a video is shown. A new frame 210 of a video is received by server 200 and provided to pre-encoder 220 and encoder 230. Each of pre-encoder 220 and encoder 230 is implemented using any suitable combination of hardware and/or software. In various implementations, software instructions for implementing pre-encoder 220 and/or encoder 230 are stored in memory 240. Memory 240 is representative of any number and type of memory devices. In one implementation, pre-encoder 220 generates block bit budgets 225 for the blocks of new frame 210 based on an analysis of the blocks of new frame 210. In one implementation, rate controller 232 adjusts the block bit budgets 225 generated by pre-encoder based on current budget conditions (i.e., is the budget trajectory on track). Encoder 230 then adjusts encoding parameters to cause the encoded blocks to meet or closely approximate the assigned block bit budgets 225 when generating encoded bitstream 235. In one implementation, the components of server 200 are included within server 105 (of FIG. 1). It is noted that in other implementations, server 200 includes other components and/or is arranged in other suitable manners than is shown in FIG. 2.

In one implementation, pre-encoder 220 processes new frame 210 on a block-by-block basis. For each block, pre-encoder 220 determines which contextual indicators are present in the block. In one implementation, contextual indicators include signs, text, and memory colors. In other implementations, pre-encoder 220 searches for other types of contextual indicators. Pre-encoder 220 generates relative importance values for the blocks based on the contextual indicators that were detected in the blocks. The importance values are then used to generate block bit budgets 225 which are conveyed to encoder 230. In another implementation, pre-encoder 220 provides suggested bit budgets to rate controller 232, and then rate controller 232 adjusts the suggested bit budgets to create final bit budgets that are used for encoding the blocks of new frame 210. In a further implementation, pre-encoder 220 conveys the importance values to rate controller 232 and then rate controller 232 assigns bit budgets to the blocks based on their importance values.

In various implementations, pre-encoder 220 and rate controller 232 work together in a variety of different manners to determine the final bit budgets that are used for encoding the blocks of new frame 210. In one implementation, pre-encoder 220 assigns block bit budgets 225 to the blocks without rate controller 232 performing any adjustments to block bit budgets 225. In another implementation, pre-encoder 220 assigns block bit budgets 225 to the blocks and then these block bit budgets 225 are refined by rate controller 232 based on current budget conditions. In a further implementation, rate controller 232 generates the bit budgets and pre-encoder 220 provides guidance on adjustments to make to the bit budgets of specific individual blocks. In other implementations, other technologies can affect the bit budgets based on effects that the human visual system does not perceive well in certain situations such as fast motion, regions with dissimilar motion vectors, and so on.

In one implementation, encoder 230 determines a quantization strength to use for encoding each block of new frame 210 based on the bit budget assigned to the block. In other implementations, encoder 230 adjusts other settings that are used when encoding each block of new frame 210 based on the bit budget assigned to the block. In one implementation, the quantization strength refers to a quantization parameter (QP). It should be understood that when the term QP is used within this document, this term is intended to apply to other types of quantization strength settings that are used with any type of coding standard. When encoding a given block, encoder 230 selects a QP which will result in a bit-size for the block that closely matches the bit budget calculated by pre-encoder 220. Matching the bit budgets assigned to the blocks by pre-encoder 220 allows encoder 230 to meet a desired bitrate for the encoded bitstream 235.

Figure 3:
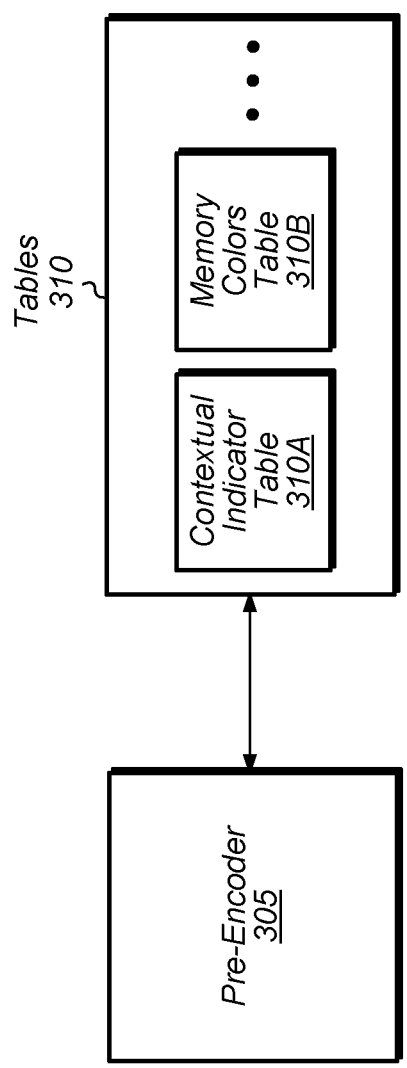
FIG. 3 is a block diagram of one implementation of a pre-encoder coupled to tables.

Referring now to FIG. 3, a block diagram of one implementation of a pre-encoder 305 coupled to tables 310 is shown. Pre-encoder 305 is coupled to any number of tables 310 specifying various settings which will affect the generation of bit budgets for the individual blocks of frames being encoded. For example, contextual indicator table 310A specifies a plurality of contextual indicators that have a high value and will increase the relative importance of blocks of a frame which contain any of these contextual indicators. Contextual indicator table 310A also includes a score to apply to each contextual indicator. Alternatively, in another implementation, a separate scoring table is including in tables 310 to specify which score to apply to each contextual indicator that is detected within the frame.

Memory colors table 310B identifies specific memory colors which will also increase the relative importance of blocks of a frame which contain more than a threshold amount of pixels of one of these memory colors. For example, in one implementation, a flesh tone is identified as a memory color in one version of a memory colors table 310B. In another implementation, a blue sky is identified as a memory color in another version of a memory colors table 310B. Other types of memory colors can also be specified in other implementations. Memory colors table 310B can also specify that memory colors can have more value in the presence of a first attribute and/or memory colors can have less value in the presence of a second attribute. For example, in one implementation, flesh tone has more value in bright areas of a frame. Also, in one implementation, flesh tone has less value in areas of rapid motion. In another implementation, grass and trees are less important when affected by depth of field. Other examples of attributes that affect the relative value of a memory color are possible and are contemplated.

In one implementation, each application executed by a host computing system (e.g., system 100 of FIG. 1) loads a new set of tables 310 for pre-encoder 305. For example, a self-driving vehicle application loads a first set of tables 310 to be used by pre-encoder 305 when analyzing frames captured while executing the self-driving vehicle application. Also, a video game application loads a second set of tables to be used by pre-encoder 305 when analyzing frames rendered by the video game application. Still further, a video game streaming application loads a third set of tables to be used by pre-encoder 305 when analyzing frames being streamed by the video game streaming application. Other types of applications can also load specific sets of tables 310 for pre-encoder 305 that are optimized for the type of frames that will be generated and/or captured. Also, a single application can load different sets of tables 310 for different phases of the application as video content changes from phase to phase.

For example, in a video game application or movie, a first table is loaded for a first scene of the video game or movie. The first scene can have specific types of contextual indicators that are regarded as more important than other types of contextual indicators. Then, during a second scene, a second table is loaded with a new set of contextual indicators. This reloading of tables can continue for subsequent scenes of the video game or movie. In another implementation, a self-driving vehicle application loads different tables depending on the current situation. For example, while the vehicle is on a highway traveling at a relatively high speed, a first table of contextual indicators is loaded. Alternatively, in a residential neighborhood or near a school, a second table of contextual indicators is loaded. Other tables can be loaded when the self-driving vehicle encounters other situations (e.g., parking lot, freeway on-ramp, fueling station, charging station, toll booth). To detect the use case scenario (e.g., detecting a parking lot or highway), a known approach can be used. The approach can be a combination of different analysis such as analyzing GPS data and data from video analysis.

Figure 4:
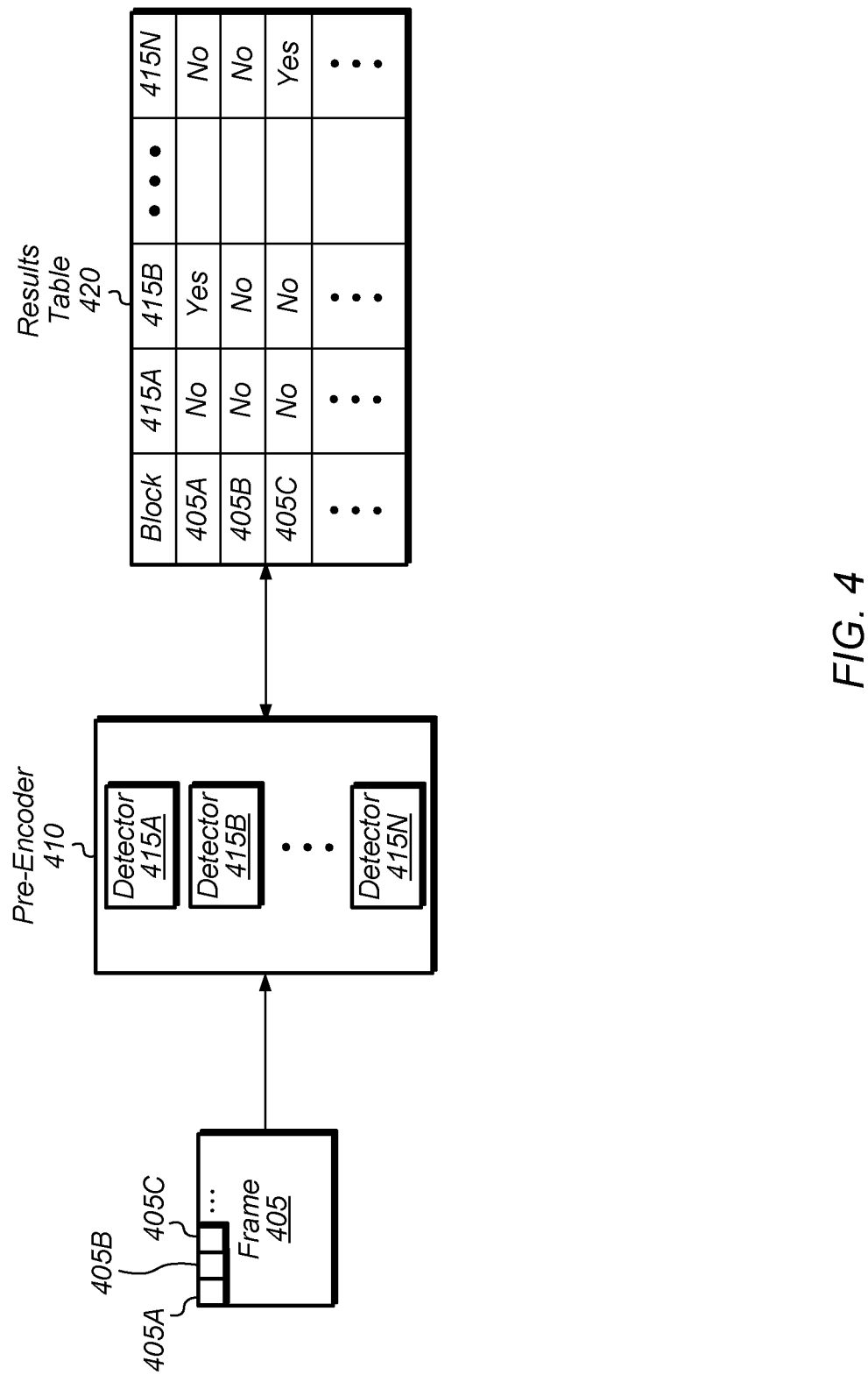
FIG. 4 is a block diagram of one implementation of a pre-encoder with a plurality of detectors.

Turning now to FIG. 4, a block diagram of one implementation of a pre-encoder 410 with a plurality of detectors 415A-N is shown. In one implementation, pre-encoder 410 receives a frame 405 and performs a pre-analysis process on frame 405. As shown in FIG. 4, pre-encoder 410 includes a plurality of detectors 415A-N. It is noted that detectors 415A-N are logical representations of detectors, with detectors 415A-N implemented using any suitable combination of software and/or hardware. For example, in one implementation, each detector 415A-N is a trained neural network, with each trained neural network designed to detect a specific type of contextual indicator. Also, it should be understood that a single detector can perform the functions of multiple detectors 415A-N in some implementations. For example, in another implementation, a single trained neural network is designed to detect multiple different types of contextual indicators.

In one implementation, each detector 415A-N is responsible for analyzing the blocks of frame 405 to determine if a block contains a corresponding contextual indicator. For example, a first detector 415A searches for signs in the blocks of frame 405, a second detector 415B searches for text in the blocks of frame 405, a third detector 415N searches for memory colors in the blocks of frame 405, and so on. In other implementations, detectors 415A-N can search for other types of contextual indicators in the blocks of frame 405. After performing the pre-analysis on frame 405 using detectors 415A-N, pre-encoder 410 generates results table 420 to record which contextual indicators were discovered in which blocks of frame 405. For example, in one implementation, results table 420 includes a row for each block of frame 405, and each column of records table 420 corresponds to a specific detector 415A-N.

Results table 420 is representative of one example of the results of a pre-analysis phase on frame 405. As shown in results table 420, block 405A has a "No" in columns 415A and 415N and a "Yes" in column 415B. This indicates that block 405A of frame 405 contains the contextual indicator corresponding to detector 415B but was not found to contain the contextual indicators corresponding to detectors 415A and 415N. Also, entries for blocks 405B-C are also shown in results table 420. It should be understood that results table 420 is merely indicative of one example of a results table. In other implementations, results table 420 can be structured in other suitable manners. For example, in another implementation, results table 420 can include an importance value or metric in each field rather than a Yes or No. Alternatively, another table or matrix can be applied to results table 420 to convert the Yes and No values into importance values. The importance values can then be translated into corresponding bit budgets by pre-encoder 410 or by an encoder (not shown). In some cases, pre-encoder 410 cross-correlates between columns of results table 420 to increase or decrease the importance value if the presence of one contextual indicator is found in the presence of another contextual indicator, on a case-by-case basis.

Figure 5:
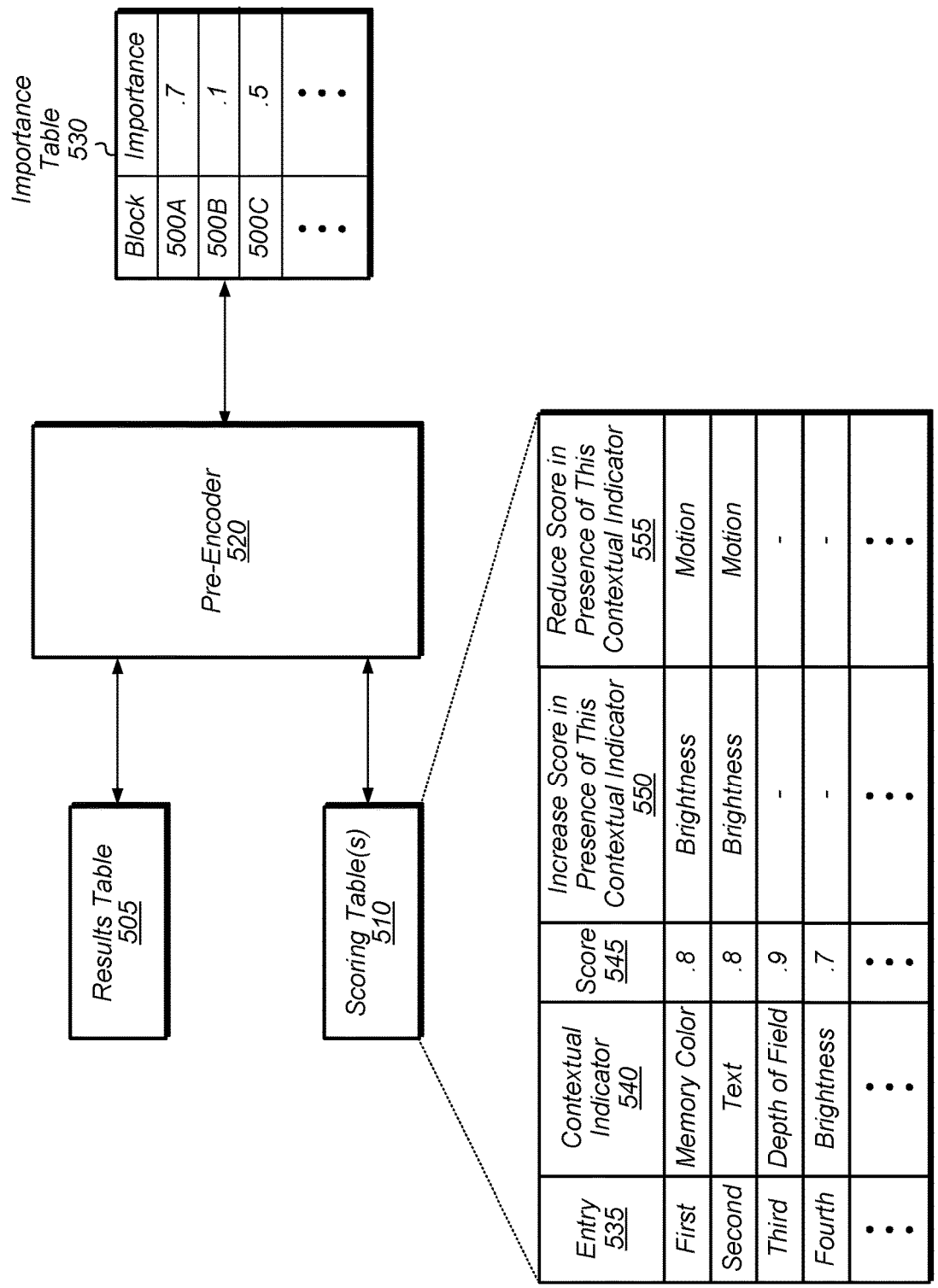
FIG. 5 is a block diagram of one implementation of a pre-encoder generating an importance table.

Referring now to FIG. 5, a block diagram of one implementation of a pre-encoder 520 generating an importance table 530 for blocks of a frame is shown. In one implementation, a pre-encoder generates a results table 505 for the blocks of a frame, as was described in the previous discussion associated with FIG. 4. Then, pre-encoder 520 generates importance table 530 by combining the values retrieved from scoring table(s) 510 with the values of results table 505. For example, in one implementation, each row of results table 505 has a plurality of fields, with each field including a "Yes" or "No" to indicate the presence or absence, respectively, of a corresponding contextual indicator. An example of this type of results table is shown as results table 420 (of FIG. 4).

In one implementation, scoring table(s) 510 include a score field 545 to apply to each "Yes" value of the columns of the entry for a given block. Then, the scores are added up to generate the importance values shown for blocks 500A-C of importance table 530. One example of a scoring table 510 in accordance with one implementation is shown in expanded form at the bottom of FIG. 5. In one implementation, there is a row for each contextual indicator, with separate columns for entry field 535, contextual indicator field 540, score field 545, increase score in presence of this contextual indicator field 550, and decrease score in presence of this contextual indicator field 555.

In one implementation, the score applied to a contextual indicator specified in field 540 should be increased if this contextual indicator is in the presence of the contextual indicator specified in field 550. For example, if a memory color is found in a bright area of the frame, then the score in field 545 should be increased. The amount to increase field 545 can be a fixed amount (e.g., 10%) or in another implementation, the amount to increase field 545 can be specified in a column of table 510. Alternatively, the score should be decreased if the contextual indicator specified in field 540 is in the presence of the contextual indicator specified in field 550. For example, if a memory color is found in an area of the frame with a greater than a threshold amount of motion, then the score in field 545 should be decreased for the memory color. The amount of the decrease in the score can be a fixed amount, specified in table 510, or specified in some other manner.

Blocks 500A-C are representative of the blocks of a frame being analyzed by pre-encoder 520. In one implementation, importance table 530 is provided to an encoder (e.g., encoder 230 of FIG. 2). The encoder allocates a bit budget to each block of a frame based on the value in importance table 530 corresponding to the block. For example, the higher the value in importance table 530 for a given block, the higher the bit budget that is allocated for the given block.

Figure 6:
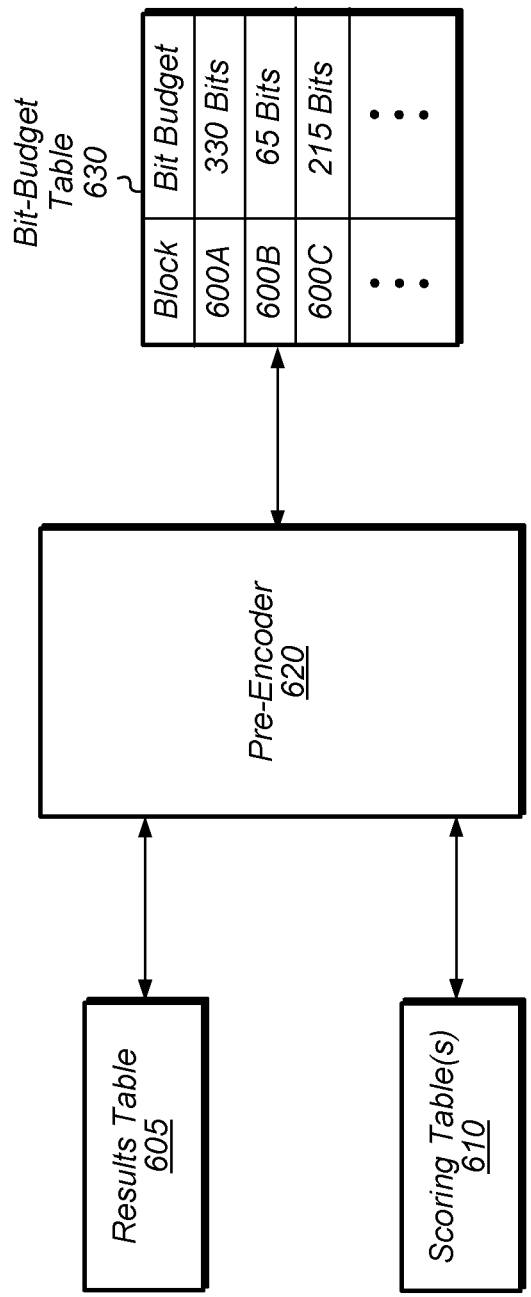
FIG. 6 is a block diagram of one implementation of a pre-encoder generating a bit-budget table.

Turning now to FIG. 6, a block diagram of one implementation of a pre-encoder 620 generating a bit-budget table 630 is shown. In one implementation, rather than generating an importance table (e.g., importance table 530), pre-encoder 620 generates bit-budget table 630 based on results table 605 and scoring table(s) 610. Bit-budget table 630 is then provided to an encoder (e.g., encoder 230 of FIG. 2) which encodes the blocks to meet the per-block bit-budgets when encoding the corresponding frame. Bit-budget table 630 is generated in a similar manner to importance table 530 as described in the discussion of FIG. 5. As shown, blocks 600A-C each have a corresponding number of bits assigned to them based on their importance values. In some cases, pre-encoder 620 generates an importance table first and then uses the importance table to generate bit-budget table 630. In another implementation, pre-encoder 620 provides an importance table to the encoder and then the encoder generates bit-budget table 630 based on the importance table.

Figure 7:
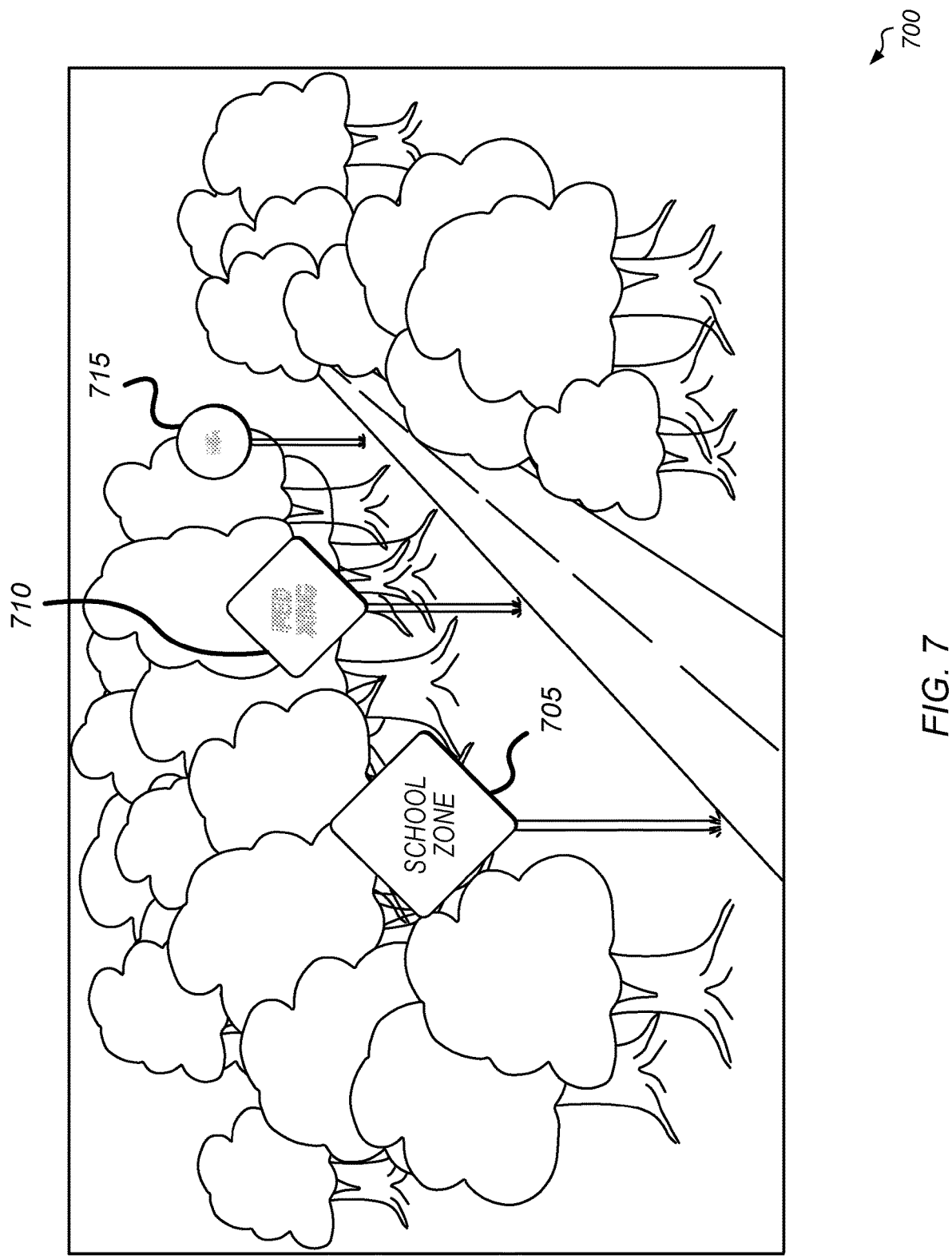
FIG. 7 illustrates one possible example of a frame being analyzed by a pre-encoder.

Referring now to FIG. 7, an example of a frame 700 being analyzed by a pre-encoder in accordance with one implementation is shown. Frame 700 is intended to represent an example of a video frame being analyzed by a pre-encoder. It is assumed for the purposes of this discussion that the pre-encoder is searching for contextual indicators such as signs and text. In one implementation, a host computing system is executing a self-driving car application. In another implementation, the host computing system is executing a video game application. In other implementations, other types of host applications can be executed which can generate a frame similar to frame 700.

As shown in FIG. 7, frame 700 includes signs 705, 710, and 715. In one implementation, in a first step of the analysis by the pre-encoder, signs 705, 710, and 715 are given a higher importance due to being identified as signs and also being identified as having text. However, a rarity analysis of frame 700 will result in a reduction of the importance of signs 705, 710, and 715 since there are a high number of blocks which include a sign and/or text. A further analysis will assign sign 705 the highest importance based on sign 705 being in focus. The other signs 710 and 715 being out of focus will cause a reduction in their importance scores.

The area outside of signs 705-715 includes trees and a road. Since the areas of frame 700 with trees are considered busy (i.e., have relatively high spatial frequency), this would result in a traditional algorithm assigning a relatively high importance and a relatively large bit budget to the blocks of these areas. However, in terms of where the user will likely be focusing their attention in frame 700, the trees are not as important as signs 705-715. Therefore, using fewer bits of the bit budget for encoding the blocks containing trees, resulting in the trees being less detailed, will not likely be perceived or noticed by the user. Therefore, it would be a better approach to use more of the bits to the blocks containing signs 705-715. However, the signs 705-715 are not of equal importance, and so the blocks containing sign 705 are assigned a higher importance than the blocks containing signs 710-715 using the techniques described in FIGS. 4-6. This higher importance will translate to a larger bit budget allocation for blocks containing sign 705 when these blocks are encoded by the encoder.

Figure 8:
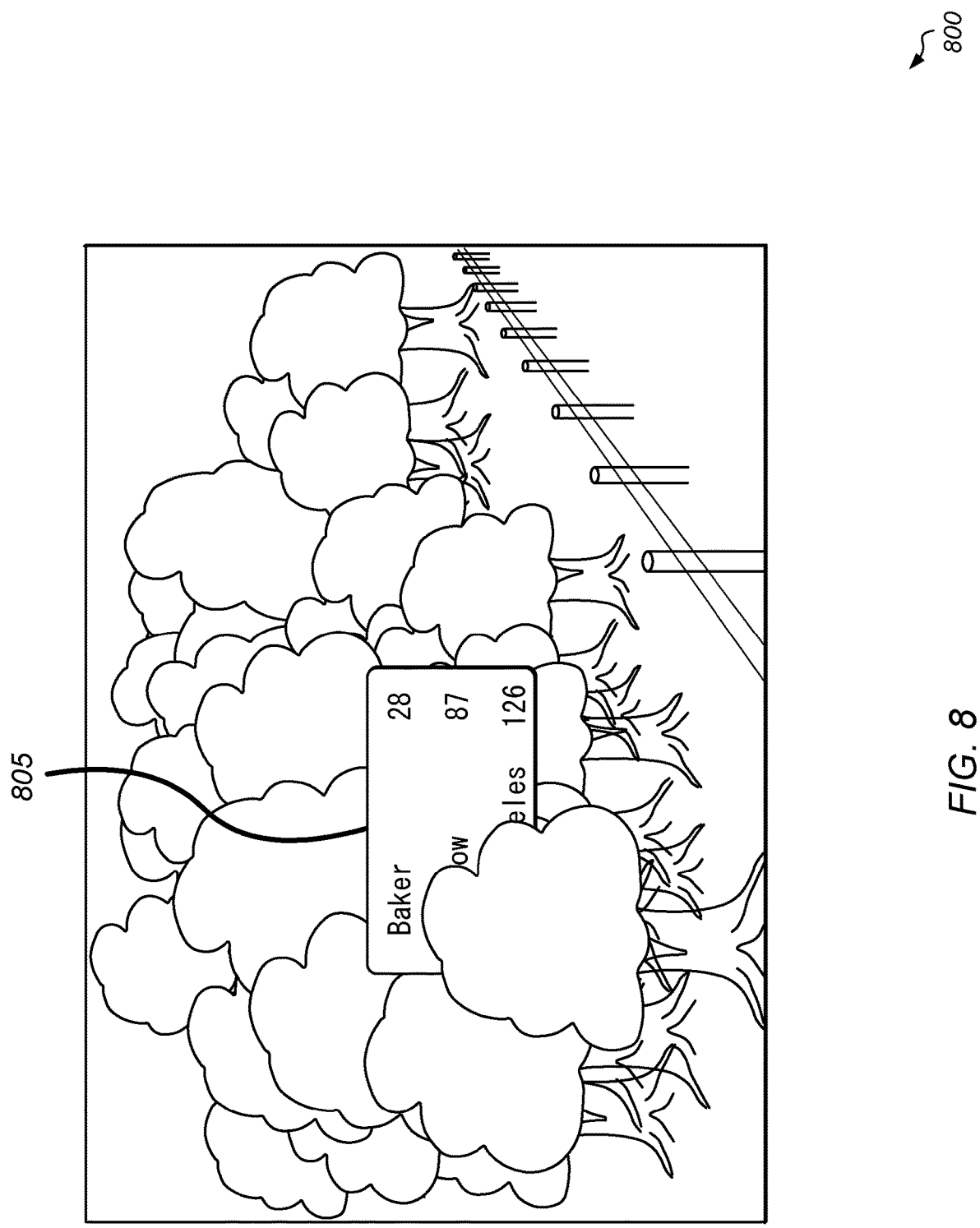
FIG. 8 illustrates one possible example of a frame being analyzed by a pre-encoder.

Turning now to FIG. 8, an example of a frame 800 being analyzed by a pre-encoder in accordance with one implementation is shown. Frame 800 is intended to represent an example of a video frame being analyzed by a pre-encoder. As shown, most of frame 800 is made up of trees and foliage. These features tend to be detected as "busy" due to the high frequency of the color changes of leaves, branches, and so on. As a result, a typical encoder assigns a large number of bits to blocks containing trees and foliage. However, for frame 800, this would be a misallocation of bits based on where the user is likely to be looking. The attention of the user will most likely be focused on sign 805. In one implementation, sign 805 meets the criteria of three separate contextual indicators with the first criteria of being a sign, the second criteria of containing text, and the third criteria of being in focus. Accordingly, when a pre-encoder (e.g., pre-encoder 220 of FIG. 2) analyzes frame 800 using the techniques described herein, the blocks containing sign 805 will be assigned a relatively high importance and will receive a relatively high share of the bit budget assigned to frame 800.

Figure 9:
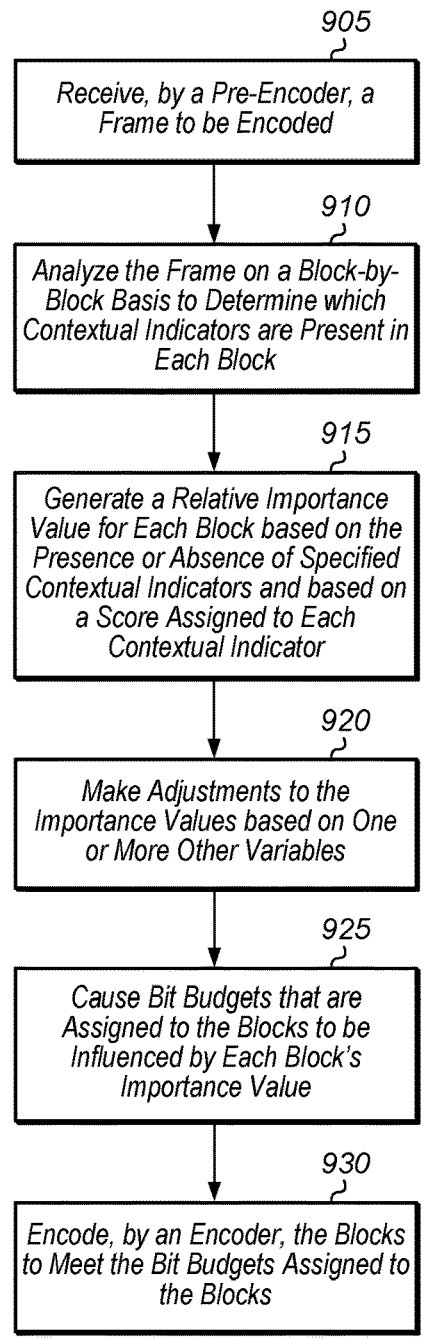
FIG. 9 is a generalized flow diagram illustrating one implementation of a method for a pre-encoder generating per-block bit budgets.
Figure 10:
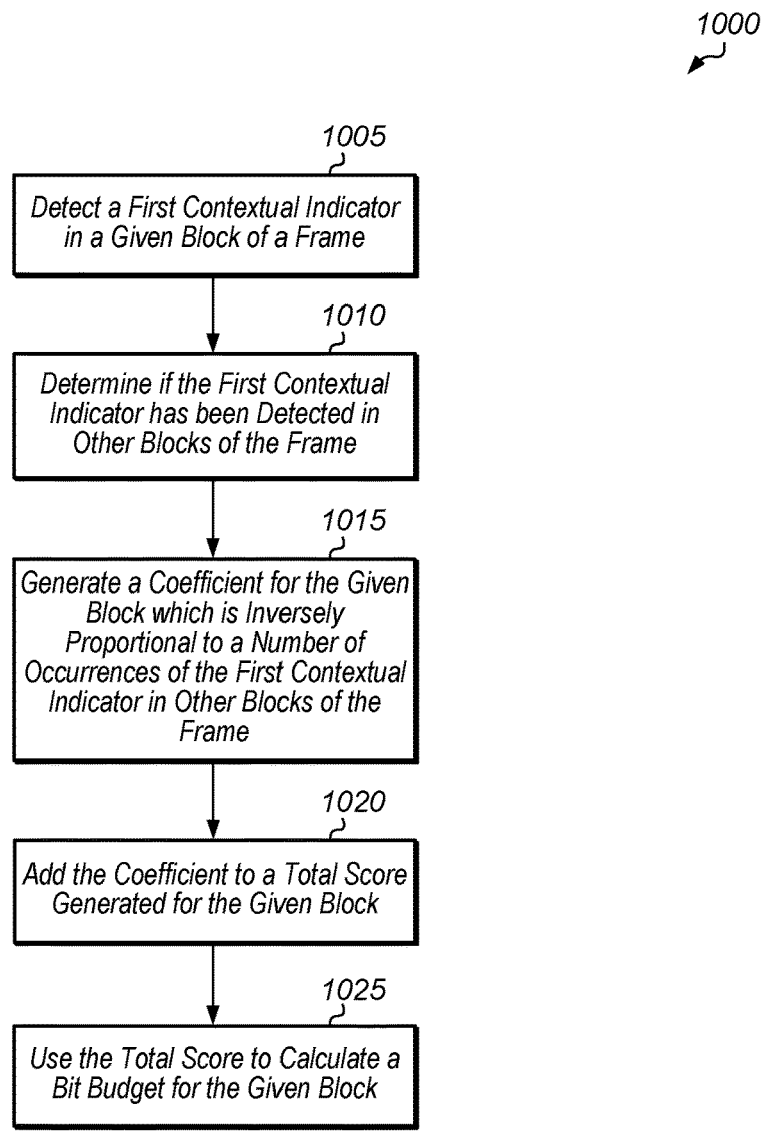
FIG. 10 is a generalized flow diagram illustrating one implementation of a method for adjusting a contextual indicator coefficient for a block of a frame based on a rarity of the contextual indicator throughout the frame.

Referring now to FIG. 9, one implementation of a method 900 for a pre-encoder generating per-block bit budgets is shown. For purposes of discussion, the steps in this implementation and those of FIG. 10 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 900.

A pre-encoder receives a frame to be encoded (block 905). The pre-encoder analyzes the frame on a block-by-block basis to determine which contextual indicators are present in each block (block 910). Contextual indicators can vary according to the implementation. In one implementation, the pre-encoder uses one or more trained neural networks to detect different contextual indicators in the blocks. Next, the pre-encoder generates a relative importance value for each block based on the presence or absence of specified contextual indicators and based on a score assigned to each contextual indicator (block 915). In one implementation, the contextual indicators are identified in a first table which is specific to a particular application being executed by the host system. In one implementation, a score associated with each contextual indicator is stored in a second table which is also specific to the particular application being executed by the host system. Then, the pre-encoder makes adjustments to the importance values based on one or more other variables (block 920). For example, the other variables can include the rarity of a particular contextual indicator within the frame as a whole, the depth of field of the block, and/or other factors.

Next, the pre-encoder causes bit budgets that are assigned to the blocks to be influenced by each block's importance value (block 925). In one implementation, the pre-encoder calculates and assigns bit budgets to the blocks based on each block's importance value. In another implementation, the pre-encoder provides the importance values to the rate controller and/or encoder, and the rate controller and/or encoder calculate and assign bit budgets to the blocks based on each block's importance value. Then, the encoder encodes the blocks to meet the bit budgets assigned to the blocks (block 930). In one implementation, the encoder adjusts a quantization parameter (QP) used for encoding the given block based on the bit-budget assigned to the given block. In other implementations, the encoder adjusts other parameters to cause the given block to be encoded with a number of bits that matches or closely approximates the bit budget assigned to the given block. After block 930, method 900 ends. It is noted that method 900 can be used in combination with one or more other techniques for generating bit budgets or importance values that influence how the blocks of a frame are encoded.

Turning now to FIG. 10, one implementation of a method 1000 for adjusting a contextual indicator coefficient for a block of a frame based on a rarity of the contextual indicator throughout the frame is shown. A pre-encoder detects a first contextual indicator in a given block of a frame (block 1005). Depending on the implementation, the first contextual indicator could be a sign, text, a memory color, or other contextual indicator. Next, the pre-encoder determines if the first contextual indicator has been detected in other blocks of the frame (block 1010). Then, the pre-encoder generates a coefficient for the given block which is proportional or inversely proportional to a number of occurrences of the first contextual indicator in other blocks of the frame (block 1015). If inversely proportional, the less frequently the first contextual indicator is detected within the frame, the higher the coefficient value generated for the given block. Next, the pre-encoder adds the coefficient to the total score generated for the given block (block 1020). In one implementation, the total score is used as the importance value of the given block. Then, the total score is used to calculate a bit budget for the given block (block 1025). After block 1025, method 1000 ends. It is noted that method 1000 can be performed for each contextual indicator of a plurality of contextual indicators as well as for each block of the frame.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
 a pre-encoder configured to:
  receive a frame to be encoded, wherein the frame comprises a plurality of blocks;
  determine, for each block of the frame, a presence of one or more contextual indicators, including a first indicator corresponding to an initial importance value score and a second indicator that the initial importance value score is to be changed when both the first indicator and the second indicator are simultaneously present;

generate a separate importance value for each block of the plurality of blocks based on a presence or absence of the one or more contextual indicators within each block;
assign a bit budget to each block based at least in part on the importance value generated for the block; and
an encoder configured to encode each block to meet the bit budget assigned to the block.

2. The apparatus as recited in claim 1, wherein the pre-encoder is further configured to:
determine a rarity of each contextual indicator throughout the frame, wherein the rarity corresponds to a number of occurrences of a contextual indicator in a frame; and
adjust the importance value of each block based on the rarity of each detected contextual indicator.

3. The apparatus as recited in claim 1, wherein the one or more contextual indicators comprise memory colors, text, and signs.

4. The apparatus as recited in claim 1, wherein the pre-encoder is further configured to:
store, for each block of the frame, an indication as to whether each of the one or more contextual indicators is present; and
generate the importance value for each block based on a score assigned to each contextual indicator that was detected in the block.

5. The apparatus as recited in claim 1, wherein the pre-encoder is further configured to:
generate the importance values for each block based at least in part on a sum of scores in a data structure.

6. The apparatus as recited in claim 1, wherein the initial importance value score is changed by either increasing or decreasing the initial importance value score when both the first indicator and the second indicator are simultaneously present.

7. The apparatus as recited in claim 1, wherein first data structure is a table, and the pre-encoder is further configured to:
receive the table comprising a plurality of entries, wherein each entry identifies a given contextual indicator and a score associated with the given contextual indicator.

8. A method comprising:
receiving, by a pre-encoder, a frame to be encoded, wherein the frame comprises a plurality of blocks;
determining, for each block of the frame, a presence of one or more contextual indicators, including a first indicator corresponding to an initial importance value score and a second indicator that the initial importance value score is to be changed when both the first indicator and the second indicator are simultaneously present;
generating a separate importance value for each block of the plurality of blocks based on a presence or absence of the one or more contextual indicators within each block;
assigning a bit budget to each block based at least in part on the importance value generated for the block; and
encoding, by the encoder, each block to meet the bit budget assigned to the block.

9. The method as recited in claim 8, further comprising:
determining a rarity of each contextual indicator throughout the frame, wherein the rarity corresponds to a number of occurrences of a contextual indicator in a frame; and
adjusting the importance value of each block based on the rarity of each detected contextual indicator.

10. The method as recited in claim 8, wherein the one or more contextual indicators comprise memory colors, text, and signs.

11. The method as recited in claim 8, further comprising:
storing, for each block of the frame, an indication as to whether each of the one or more contextual indicators is present; and
generating the importance value for each block based on a sum of scores in a data structure assigned to each contextual indicator that was detected in the block.

12. The method as recited in claim 11, wherein the initial importance value score is changed by either increasing or decreasing the initial importance value score when both the first indicator and the second indicator are simultaneously present.

13. The method as recited in claim 8, further comprising searching for a given contextual indicator in the frame, responsive to determining the given contextual indicator is specified in a data structure.

14. The method as recited in claim 8, further comprising:
receiving a first table specifying a first plurality of contextual indicators corresponding to a first application;
searching for the first plurality of contextual indicators in a first frame responsive to the first application generating the first frame to be encoded;
receiving a second table specifying a second plurality of contextual indicators corresponding to a second application; and
searching for the second plurality of contextual indicators in a second frame responsive to the second application generating the second frame to be encoded.

15. A system comprising:
a memory; and
a pre-encoder coupled to the memory, wherein the pre-encoder is configured to:
receive a frame to be encoded, wherein the frame comprises a plurality of blocks;
determine, for each block of the frame, if one or more contextual indicators are present;
access a first data structure comprising a plurality of entries, wherein each of the plurality of entries identifies a first contextual indicator, an initial importance value score associated with the contextual indicator, and a second contextual indicator that indicates the initial importance value score is to be changed when both the first contextual indicator and second contextual indicator are simultaneously present;
generate a separate importance value for each block of the plurality of blocks based on a presence or absence of the one or more contextual indicators within each block;
assign a bit budget to each block based at least in part on the importance value generated for the block; and
convey the bit budgets to an encoder and cause each block to be encoded to meet the bit budget assigned to the block.

16. The system as recited in claim 15, wherein the pre-encoder is further configured to:
determine a rarity of each contextual indicator throughout the frame, wherein the rarity corresponds to a number of occurrences of a contextual indicator in a frame; and
adjust the importance value of each block based on the rarity of each detected contextual indicator.

17. The system as recited in claim 15, wherein the one or more contextual indicators comprise memory colors, text, and signs.

18. The system as recited in claim 15, wherein the pre-encoder is further configured to generate the importance value for each block based on a score assigned to each contextual indicator that was detected in the block.

19. The system as recited in claim 15, wherein the pre-encoder is further configured to access a table specifying a plurality of contextual indicators to search for in the plurality of blocks of the frame.

20. The system as recited in claim 15, wherein the pre-encoder is further configured to:
- receive a first table specifying a first plurality of contextual indicators corresponding to a first application;
- search for the first plurality of contextual indicators in a first frame responsive to the first application generating the first frame to be encoded;
- receive a second table specifying a second plurality of contextual indicators corresponding to a second application; and
- search for the second plurality of contextual indicators in a second frame responsive to the second application generating the second frame to be encoded.

* * * * *